United States Patent Office 3,775,407
Patented Nov. 27, 1973

3,775,407
BASIC AZOLOINDOLINE DYESTUFFS
Horst Harnisch, Cologne, Germany, assignor to Bayer Aktiengesellschaft, Leverkusen, Germany
No Drawing. Filed Sept. 9, 1971, Ser. No. 179,183
Claims priority, application Germany, Sept. 9, 1970,
P 20 44 619.9
Int. Cl. C09b 23/00
U.S. Cl. 260—240.1    7 Claims

ABSTRACT OF THE DISCLOSURE

Basic dyestuffs of the formula

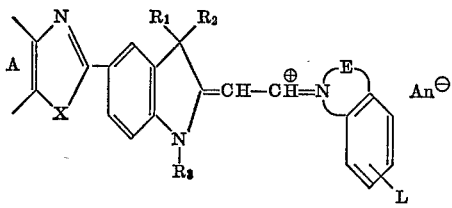

processes for their manufacture and their use for dyeing and printing of natural and synthetic materials, particularly of polyacrylnitrile and copolymers of acrylnitrile with other vinyl compounds.

---

The subject-matter of the present application comprises basic azoloindoline dyestuffs of the general formula

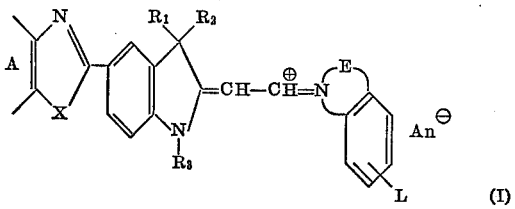

in which $R_1$ and $R_2$ mean alkyl radicals or stand for the residual members of a cycloalkyl radical; $R_3$ means an alkyl or aralkyl radical; X stands for oxygen, sulphur or $=NR_4$ where $R_4$ means hydrogen, an alkyl, cycloalkyl or aralkyl radical; A stands for the residual members of an aromatic radical; E stands for the residual members of a non-aromatic 5- or 6-membered ring; L stands for hydrogen, halogen, $C_1$-$C_4$-alkyl or $C_1$-$C_4$-alkoxy; and $An^{\ominus}$ means an anion, as well as processes for their production and their use.

Suitable aromatic radicals the residual members of which are called A are radicals of monocyclic as well as of bicyclic ring systems which may consist of aromatic-carbocyclic and/or aromatic-heterocyclic rings fused in any way and may also contain fused, partially saturated 5- or 6-membered rings.

Examples of aromatic radicals of this kind are the radicals of benzene, naphthalene, Tetralin, indane, acenaphthene, pyridine, quinoline, pyrimidine, quinoxaline and indazole. Carbocyclic radicals are preferred.

These aromatic radicals may also contain substituents such as halogen, cycloalkyl, aralkyl, phenyl, alkyl, alkoxy, alkylsulphonyl, aralkyl-sulphonyl, dialkylamino-sulphonyl, alkoxy-carbonyl, dialkylamino-carbonyl and acylamino radicals.

The alkyl radicals mentioned above preferably comprise those with 1 to 5 carbon atoms; they may contain further substituents, such as halogen, hydroxyl and alkoxy. Suitable alkyl radicals of this type are, for example, methyl, trifluoro-methyl, ethyl, chloroethyl, bromoethyl, hydroxyethyl, methoxy-ethyl, n-propyl, isopropyl and n-, i- and t-butyl.

Suitable aralkyl radicals are primarily the benzyl and phenylethyl radicals.

A suitable cycloalkyl radical is, for example, the cyclohexyl radical. Suitable alkoxy radicals are mainly those with 1 to 5 carbon atoms. As alkylsulphonyl radicals, there may primarily be mentioned the methyl- and ethyl-sulphonyl radicals; as aralkylsulphonyl radical, the benzylsulphonyl radical. Suitable dialkylamino-sulphonyl and dialkylamino-carbonyl radicals are preferably those containing methyl and ethyl groups.

Suitable alkoxy-carbonyl radicals are, for example, the methoxy-carbonyl, ethoxy-carbonyl and β-methoxy-ethoxy-carbonyl radicals.

Suitable acylamino radicals are, for example, acetyl-amino, propionylamino and methyl-sulphonylamino radicals.

Preferred alkyl radicals $R_1$ and $R_2$ are methyl and ethyl radicals. Suitable cycloalkyl radicals which may be formed by $R_1$ together with $R_2$ are cyclohexyl and cyclopentyl radicals.

Suitable alkyl radicals $R_3$ and $R_4$ are, for example, saturated or unsaturated alkyl radicals with 1 to 5 carbon atoms, which may also contain further substituents such as halogen, hydroxy, alkoxy, cyano, alkylcarbonyl, benzoyl, alkoxycarbonyl radicals. Suitable alkyl radicals of this type are, for example, methyl, ethyl, chloroethyl, bromoethyl, fluoroethyl, cyanoethyl, methoxyethyl, allyl, n-propyl, isopropyl, δ-hydroxybutyl, acetonyl, phenacyl, methoxy-carbonyl-ethyl and n-butyl. The methyl and ethyl radicals are preferred.

Preferred alkyl radicals L are methyl and ethyl groups, preferred alkoxy radicals are methoxy and ethoxy.

Examples of residual ring members E are groupings such as:

—CH₂—CH₂—, —CH(CH₃)—CH₂—,

—CH₂—CH₂—CH₂—, —C(CH₃)₂—CH₂—CH(CH₃)—,

—CH₂—CH₂—O—, —CH₂—CH₂—NH— or 1,2-cyclohexylene.

Suitable anionic radicals $An^{\ominus}$ are the organic and inorganic anions usually found in basic dyestuffs; examples are chloride, bromide, methosulphate, ethylsulphate, p-toluene-sulphonate, hydrogen sulphate, sulphate, benzenesulphonate, p-chlorobenzene-sulphonate, dihydrogen phosphate, phosphate, acetate, chloroacetate, formate, propionate, lactate, crotonate, nitrate, perchlorate, chlorozincate; and the anions of saturated or unsaturated aliphatic dicarboxylic acids, such as malonic acid, maleic acid, citric acid, oxalic acid, itaconic acid, succinic acid, glutaric acid, adipic acid, pimelic acid and suberic acid. Colourless anions which do not too strongly impair the water-solubility of the dyestuff are preferred. For dyeing from organic solvents, those anions are also often preferred which further or, at least, do not adversely affect the solubility of the dyestuff in organic solvents, such as, for example, tetrapropylene-benzene-sulphonate, dodecyl-benzene-sulphonate or the anion of tetradecane-carboxylic acid and that of ethyl-hexyl carboxylic acid.

A particularly valuable class of basic azoloindoline dyestuffs within the scope of the Formula I corresponds to the formula

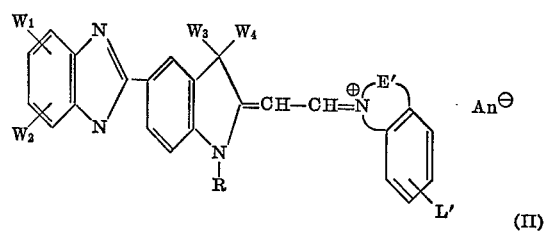

in which $W_1$ stands for hydrogen, alkyl, cyclohexyl, phenyl, chlorine, alkoxy, alkylsulphonyl, dialkylamino-sulphonyl, alkoxy-carbonyl, acylamino and $W_2$ stands for hydrogen or alkyl, the alkyl and alkoxy radicals containing 1 to 5 carbon atoms; in which $W_1$ and $W_2$ together may also represent the residual members of a fused 5- or 6-membered cycloaliphatic ring or benzene ring; $W_3$ and $W_4$, independently of one another, stand for methyl or ethyl groups; R means an alkyl radical; L' means hydrogen, methyl, methoxy, ethoxy, or chlorine; E' stands for a divalent 2- or 3-membered saturated hydrocarbon chain which may be branched by methyl groups or for a 1,2-cyclohexylene radical; and $An^\ominus$ represents an anion.

The new dyestuffs are obtained by condensing aldehydes of the formula

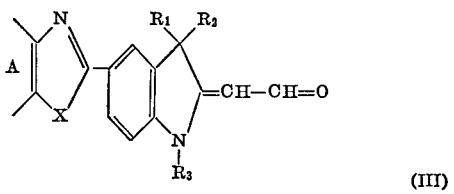

(III)

in which A, X, $R_1$, $R_2$ and $R_3$ have the same meaning as above, with a compound of the formula

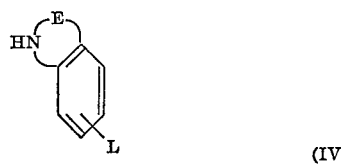

(IV)

in which E and L have the same meaning as above, under acidic conditions.

The condensation can be carried out by stirring a solution or suspension of equimolar amounts of the compounds (III) and (IV) in an organic or inorganic acid, or mixtures thereof with water, at 10–120° C., preferably at 20–60° C. Suitable acids are, for example, dilute aqueous mineral acids such as sulphuric acid, phosphoric acid or hydrochloric acid. Lower fatty acids such as formic acid, acetic acid, propionic acid, butyric acid, lactic acid and their mixtures with water are also suitable.

The condensation can also be carried out in an inert solvent, such as cetonitrile, methanol, ethanol, isopropanol, toluene, chlorobenzene, in the persence of acidic condensation agents such phosphorus oxychloride, phosphorus pentoxide, zinc chloride, aluminium chloride, tin chloride, sulphuric acid, phosphoric acid or polyphosphoric acid.

A particular method of carrying out the process according to the invention is characterised in that the aldehydes of the Formula III are used in the form of their enamines which are obtained as primary products in the Vilsmeier reaction and correspond to the formula

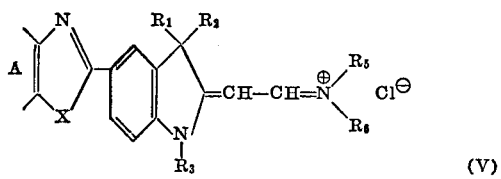

(V)

in which A, $R_1$, $R_2$ and $R_3$ have the same meaning as above; $R_5$ stands for $C_1$–$C_4$-alkyl or for phenyl; and $R_6$ stands for $C_1$–$C_4$-alkyl.

Suitable aldehydes of the Formula III are, for example the following:

1,3,3-trimethyl-5-[5'-methyl-benzoxazolyl-(2')]-2-methylene-indoline-ω-aldehyde 1-ethyl-3,3-dimethyl-5-[5'-chloro-benzoxazolyl-(2')]-2-methylene-indoline-ω-aldehyde 1-chloroethyl-3,3-dimethyl-5-[5'-trifluoromethyl-benzoxazolyl-(2')]-2-methylene-indoline-ω-aldehyde 1-n-propyl-3,3-dimethyl-5-[5'-cyclohexyl-benzoxazolyl-(2')]-2-methylene-indoline-ω-aldehyde 1-allyl-3,3-dimethyl-5-[5'-phenyl-benzoxazolyl-(2')]-2-methylene-indoline-ω-aldehyde 1-n-butyl-3,3-dimethyl-5-[5'-methoxy-benzoxazolyl-(2')]-2-methylene-indoline-ω-aldehyde 1-methyl-3,3-pentamethylene-5-benzoxazolyl-(2')-2-methylene-indoline-ω-aldehyde 1-cyanoethyl-3,3-dimethyl-5-[5',6'-dimethyl-benzoxazolyl-(2)]-2-methylene-indoline-ω-aldehyde 1-benzyl-3,3-dimethyl-5-[5'-bromobenzoxazolyl-(2')]-2-methylene-indoline-ω-aldehyde 1-β-phenylethyl-3,3-diethyl-5-[5'-tert.-butyl-benzoxazolyl-(2')]-2-methylene-indoline-ω-aldehyde 1-p-chlorobenzyl-3,3-dimethyl-5-[5'-fluoro-benzoxazolyl-(2')]-2-methylene-indoline-ω-aldehyde 1-methoxycarbonylmethyl-3,3-dimethyl-5-[5'-ethyl-benzoxazolyl-(2')]-2-methylene-indoline-ω-aldehyde 1-β-ethoxycarbonyl-ethyl-3,3-dimethyl-5-[5'-ethylsulphonylbenzoxazolyl-(2')]-2-methylene-indoline-ω-aldehyde 1-β-dimethylamino-carbonylethyl-3,3-dimethyl-5-[5'-dimethylaminosulphonyl-benzoxazolyl-(2')]-2-methylene-indoline-ω-aldehyde 1,3,3-trimethyl-5-[5'-β-bromoethyl-benzoxazolyl-(2')]-2-methylene-indoline-ω-aldehyde 1,3,3-trimethyl-5-[5'-acetylamino-benzoxazolyl-(2')]-2-methylene-indoline-ω-aldehyde 1,3,3-trimethyl-5-[5'-chloroethyl-benzoxazolyl-(2')]-2-methylene-indoline-ω-aldehyde 1,3,3-trimethyl-5-[5'-benzyl-benzoxazolyl-(2')]-2-methylene-indoline-ω-aldehyde 1,3,3-trimethyl-5-[5'-β-phenylethyl-benzoxazolyl-(2')]-2-methylene-indoline-ω-aldehyde 1,3,3-trimethyl-5-[5'-methoxycarbonyl-benzoxazolyl-(2')]-2-methylene-indoline-ω-aldehyde 1,3,3-trimethyl-5-[5'-dimethylamino-carbonyl-benzoxazolyl-(2')]-2-methylene-indoline-ω-aldehyde 1,3,3-trimethyl-5-[5'-β-methoxy-ethoxycarbonyl-benzoxazolyl-(2')]-2-methylene-indoline-ω-aldehyde 1,3,3-trimethyl-5-[5',6'-tetramethylene-benzoxazolyl-(2')]-2-methylene-indoline-ω-aldehyde 1,3,3-trimethyl-5-[5',6'-trimethylene-benzoxazolyl-(2')]-2-methylene-indoline-ω-aldehyde 1,3,3-trimethyl-5-naphth(1,2-d)oxazolyl-(2')-2-methylene-indoline-ω-aldehyde 1,3,3-trimethyl-5-oxazolo(5,4-b)pyridine-(2')-2-methylene-indoline-ω-aldehyde 1,3,3-trimethyl-5-oxazolo(4,5-g)quinoline-(2')-2-methylene-indoline-ω-aldehyde 1,3,3-trimethyl-5-oxazolo(4,5-d)pyridazine-(2')-2-methylene-indoline-ω-aldehyde 1,3,3-trimethyl-5-oxazolo(4,5-d)quinoxaline-(2')-2-methylene-indoline-ω-aldehyde 1,3,3-trimethyl-5-oxazolo(5,4-d)pyrimidine-(2')-2-methylene-indoline-ω-aldehyde 1,3,3-trimethyl-5-acenaphth(5,4-d)oxazolyl-(8')-2-methylene-indoline-ω-aldehyde 1,3,3-trimethyl-5-[1'-methyl-benzimidazolyl-(2')]-2-methylene-indoline-ω-aldehyde 1,3,3-triethyl-5-[1'-β-cyanoethyl-5'-methyl-benzimidazolyl-(2')]-2-methylene-indoline-ω-aldehyde 1,3,3-trimethyl-5-[5'-ethoxy-1'-ethyl-benzimidazolyl-(2')]-2-methylene-indoline-ω-aldehyde 1,3,3-trimethyl-5-imidazolo(5,4-d)pyrimidine-(2')-2-methylene-indoline-ω-aldehyde 1,3,3-trimethyl-5-[6'-methyl-benzothiazolyl-(2')]-2-methylene-indoline-ω-aldehyde 1,3,3-trimethyl-5-[6'-methoxy-benzothiazolyl-(2')]-2-methylene-indoline-ω-aldehyde 1,3,3-triethyl-5-[5'-chloro-benzothiazolyl-(2')]-2-methylene-indoline-ω-aldehyde.

The above aldehydes corresponding to the Formula III are obtained according to the instructions in my copending patent application Ser. No. 179,181, filed Sept. 9, 1970.

Suitable reaction components of the Formula IV are, for example, 2-methyl-indoline, indoline, 1,2,3,4-tetrahydroquinoline, 2,2,4-trimethyl-1,2,3,4-tetrahydroquinoline, 1,2,3,4 - tetrahydroquinoxaline, 1,2,3,4,4a,9a - hexahydrocarbazole, 2,5,6-trimethyl-indoline, 5-chloroindoline, 2-methyl-5-bromoindoline, 5-methoxy-indoline, 5-ethoxy-indoline, 3,3-dihydro-4H-benzoxazine-(1,4).

Another process for the production of the new azoloindoline dyestuffs is characterised in that the N-formyl derivatives of (IV) corresponding to the formula

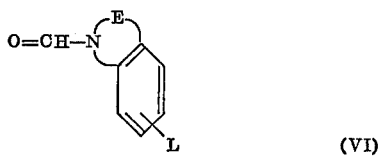

in which E and L have the same meaning as above, are condensed with azoloindoline-2-methylene compounds of the formula

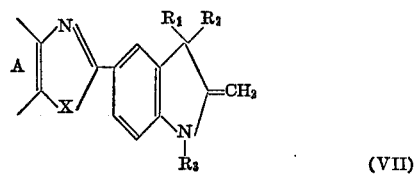

in which A, X, $R_1$, $R_2$ and $R_3$ have the same meaning as above, under acidic conditions.

This reaction is carried out, for example, by heating a component of the Formula IV and formic acid in an inert water-immiscible solvent, such as benzene, toluene, chlorobenzene, at boiling temperature until the water has been azeotropically removed, mixing the resultant solution of a compound of the Formula VI with the equivalent amount of an azoloindoline-methylene compound of the Formula VII, adding at room temperature an acidic condensation agent, such as phosphorus oxychloride, phosphorus pentoxide, polyphosphoric acid or sulphuric acid, and carrying out the condensation at a temperature ranging from 20 to 70° C.

The new azoloindolines of the Formula I are valuable dyestuffs which can be used for the dyeing and printing of materials of leather, tanned cotton, cellulose, synthetic superpolyamides and superpolyurethanes, as well as for the dyeing of lignin-containing fibres such as coconut, jute and sisal. They are further suited for the production of writing liquids, stamping inks, pastes for ball point pens, and they can also be used in offset printing.

Materials suitable for dyeing with the basic dyestuffs of the general Formula I are primarily loose material, fibres, filaments, ribbons, fabrics or knitted fabrics consisting of polyacrylonitrile or of copolymers of acrylonitrile with other vinyl compounds, such as vinyl chloride, vinylidene chloride, vinyl fluoride, vinyl acetate, vinylpyridine, vinyl-imidazole, vinyl alcohol, acrylic and methacrylic acid esters and amides, as·dicyanoethylene; or loose material, fibres, filaments, ribbons, fabrics or knitted fabrics of acid-modified aromatic polyesters and acid-modified polyamide fibres. Acid-modified aromatic polyesters are, for example, polycondensation products of sulphoterephthalic acid and ethylene glycol, i.e. polyethylene glycol terephthalates containing sulphonic acid groups (type Dacron 64 of E. I. du Pont de Nemours and Company), such as are described in Belgian patent specification No. 549,179 and U.S. patent specification No. 2,893,816.

Dyeing can be carried out from a weakly acidic bath; it is expedient to introduce the material into the dyebath at 40 to 60° C., and then to dye at boiling temperature. It is also possible to dye under pressure at temperature above 100° C. Furthermore, the dyestuffs can be added to spinning solutions for the production of fibres containing polyacrylonitrile, or they can be applied to the unstretched fibre.

The dyeings and prints obtained on polyacrylonitrile or acid-modified polyesters and acid-modified polyamide are characterised by very good fastness to light, wet processing, rubbing and sublimation and by a high affinity to the fibre.

With the dyestuffs of the Formula I according to the invention there are produced on the aforesaid fibres and fabrics brilliant dyeings in greenish to reddish yellow shades which are characterised, especially on polyacrylonitrile, by an unusual brilliancy, especially high strength of colour and particularly good texturing and drawing properties.

The basic yellow dyestuffs hitherto proposed do not have these advantageous properties to the same extent. With anionic precipitating agents, such as alumina, tannin, phosphotungstic, (molybdic) acids, the dyestuffs of the Formula I form pigments which are fast to light and can be used with advantage in paper printing.

The dyestuffs can be used individually or in mixtures.

The dyestuffs of the Formula I according to the invention are suited for the dyeing of shaped articles consisting of polymers or copolymers of acrylonitrile, as.dicyanoethylene, acid-modified aromatic polyesters or acid-modified synthetic superpolyamides with the use of chlorinated hydrocarbons as dyebath, if they carry substituents which further the solubility in chlorinated hydrocarbons, such as e.g. the tert.-butyl group, or if $An^-$ is the anion of a mono-basic organic acid with 4-30 carbon atoms. Organic acids of this type are, for example, 2-ethyl-caproic acid, lauric acid, oleic acid, linoleic acid; a mixture of aliphatic carboxylic acids with 15-19 carbon atoms (versatic acid 1519); a mixture of aliphtic carboxylic acids with 9-11 carbon atoms (versatic acid 911); coconut fatty acid first runnings, tetradecanic acid, undecylenic acid, dimethylpropanic acid, dimethylacetic acid; carboxylic acids the carbon chain of which is interrupted by hetero atoms, such as nonylphenol tetraethylene glycol ether-propionic acid, nonylphenol diethylene glycol ether-propionic acid, dodecyl tetraethylene glycol ether-propionic acid, 3-(nonyloxy)-propionic acid, 3-(isotridecyloxy)-propionic acid, 3-(isotridecyloxy)-diethylene glycol ether-propionic acid, ether-propionic acid of the alcohol mixture with 6-10 carbon atoms, nonylphenoxy-acetic acid; aromatic carboxylic acids such as tert.-butyl-benzoic acid; cycloaliphatic carboxylic acids such as hexahydrobenzoic acid, cyclohexene-carboxylic acid, abietic acid; and sulphonic acids such as tetrapropylene-benzene-sulphonic acid.

Dyestuffs of the Formula I in which $An^\ominus$ is the anion of one of the acids mentioned above, are particularly preferred.

If the dyestuffs according to the invention are present in the form of salts of the aforesaid monobasic organic acids with 4-30 carbon atoms, then it is possible to prepare quite stable concentrated solutions of these dyestuffs in chlorinated hydrocarbons, possibly with the addition of polar organic solvents which are completely miscible with chlorinated hydrocarbons, such as butyrolactone, dimethyl formamide, methanol, dioxan, acetonitrile, methyl ethyl ketone, nitrobenzene, dimethyl sulphoxide, benzonitrile, 2-nitrochlorobenzene.

To prepare solutions of this kind, the methine dyestuffs according to the invention, in the form of salts of organic acids with 4-30 carbon atoms, are stirred, possibly with the addition of polar organic solvents which are completely miscible with chlorinated hydrocarbons, optionally at an elevated temperature.

The parts given in the following examples are parts by weight, unless otherwise stated; the temperatures are degrees centigrade.

EXAMPLE 1

132 parts 1,3,3-trimethyl - 5 - [5'-methyl-bonzoxazolyl-(2')] - 2 - methylene-indoline-ω-aldehyde and 54 parts 2-methylindoline are heated in 300 parts by volume of glacial acetic acid and 25 parts of water at 35–36° for 2 hours. The mixture is subsequently poured into 7500 parts of water at 70°. 370 parts sodium chloride are added at 55° within 20 minutes while stirring. After stirring until the mixture is cold, the dyestuff is filtered off with suction, washed with 500 parts by volume of a 10% sodium chloride solution, and dried in a vacuum at 50°. There are obtained 208 parts of a dyestuff of the formula

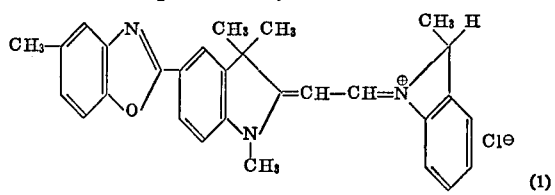
(1)

It dyes materials of polyacrylonitrile, acid-modified polyesters or acid-modified polyamide in brilliant greenish yellow shades; the dyeing on polyacrylonitrile, in particular, is characterised by outstanding fastness properties.

Similarly valuable dyestuffs of the following formulae are obtained in an analogous way with the use of the corresponding starting materials:

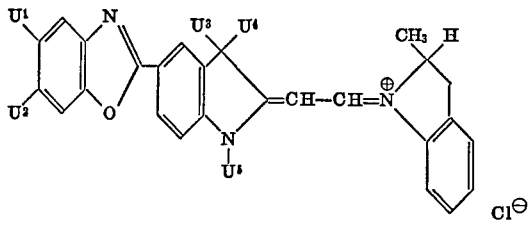

TABLE A

| No. | $U^1$ | $U^2$ | $U^3$ | $U^4$ | $U^5$ | Shade on PAN |
|---|---|---|---|---|---|---|
| 2 | $CH_3$ | H | $CH_3$ | $CH_3$ | $C_2H_5$ | Greenish yellow. |
| 3 | Cl | H | $CH_3$ | $CH_3$ | $C_2H_5$ | Do. |
| 4 | ⟨H⟩— | H | $CH_3$ | $CH_3$ | $C_2H_5$ | Do. |
| 5 | ⟨ ⟩— | H | $CH_3$ | $CH_3$ | $CH_3$ | Do. |
| 6 | $CH_3O$ | H | $CH_3$ | $CH_3$ | $CH_3$ | Do. |
| 7 | H | $CH_3O$ | $CH_3$ | $CH_3$ | $CH_3$ | Do. |
| 8 | Br | H | $CH_3$ | $CH_3$ | $CH_3$ | Do. |
| 9 | $CH_3$ | $CH_3$ | $CH_3$ | $CH_3$ | $CH_3$ | Do. |
| 10 | $(CH_3)_3C-$ | H | $CH_3$ | $CH_3$ | $CH_3$ | Do. |
| 11 | F | H | $CH_3$ | $CH_3$ | $CH_3$ | Do. |
| 12 | $C_2H_5-$ | H | $CH_3$ | $CH_3$ | $CH_3$ | Do. |
| 13 | $C_2H_5SO_2-$ | H | $CH_3$ | $CH_3$ | $CH_3$ | Do. |
| 14 | $(CH_3)_2N-SO_2-$ | H | $CH_3$ | $CH_3$ | $CH_3$ | Do. |
| 15 | $CH_3O-\underset{\underset{O}{\|}}{C}-$ | H | $CH_3$ | $CH_3$ | $CH_3$ | Do. |
| 16 | ⟨ ⟩—$CH_2-$ | H | $CH_3$ | $CH_3$ | $CH_3$ | Do. |
| 17 | $(C_2H_5)_2N-\underset{\underset{O}{\|}}{C}-$ | H | $CH_3$ | $CH_3$ | $CH_3$ | Do. |
| 18 | H | H | $C_2H_5$ | $C_2H_5$ | $C_2H_5$ | Do. |
| 19 | $CH_3-\underset{\underset{O}{\|}}{C}-NH-$ | H | $CH_3$ | $CH_3$ | $CH_3$ | Do. |
| 20 | $(CH_3)_2CH-$ | H | $CH_3$ | $CH_3$ | $CH_3$ | Do. |
| 21 | $CH_3-\underset{\underset{CH_3}{\|}}{\overset{\overset{CH_3}{\|}}{C}}-CH_2-\underset{\underset{CH_3}{\|}}{\overset{\overset{CH_3}{\|}}{C}}-$ | H | $CH_3$ | $CH_3$ | $CH_3$ | Do. |
| 22 | $C_2H_5O$ | H | $CH_3$ | $CH_3$ | $CH_3$ | Do. |
| 23 | $CH_3SO_2-NH-$ | H | $CH_3$ | $CH_3$ | $CH_3$ | Do. |
| 24 | $CH_3-CH_2-CH_2-\underset{\underset{O}{\|}}{C}-NH-$ | H | $CH_3$ | $CH_3$ | $CH_3$ | Do. |

TABLE A—Continued

| No. | U¹ | U² | U³ | U⁴ | U⁵ | Shade on PAN |
|---|---|---|---|---|---|---|
| 25 | CH₃ | H | CH₃ | CH₃ | —CH₂—CH₂—CH₃ | Do. |
| 26 | CH₃ | H | CH₃ | CH₃ | —CH₂—CH₂—CH₂—CH₃ | Do. |
| 27 | CH₃ | H | CH₃ | CH₃ | —CH₂—CH₂—CN | Do. |
| 28 | CH₃ | H | CH₃ | CH₃ | —CH₂—C(O)—OCH₃ | Do. |
| 29 | CH₃ | H | CH₃ | CH₃ | —CH₂—CH₂—C(O)—OC₂H₅ | Do. |
| 30 | CH₃ | H | CH₃ | CH₃ | —CH₂—CH₂—Cl | Do. |
| 31 | CH₃ | H | CH₃ | CH₃ | —CH₂—CH=CH₂ | Do. |
| 32 | CH₃ | H | CH₃ | CH₃ | —CH₂—C₆H₅ | Do. |

TABLE B

| Number | D¹ | | Shade on PAN |
|---|---|---|---|
| 33 | —CH=N⁺(indoline-OCH₃) | Cl⁻ | Yellow. |
| 34 | —CH=N⁺(tetrahydroquinoline) | Cl⁻ | Greenish yellow. |
| 35 | —CH=N⁺(2,2-dimethyl-3-methylindoline) | Cl⁻ | Do. |
| 36 | —CH=N⁺(acridine, H) | Cl⁻ | Do. |
| 37 | —CH=N⁺(dimethylbenzoxazine) | Cl⁻ | Yellow. |
| 38 | —CH=N⁺(2-methyl-5-Br-indoline) | Cl⁻ | Greenish yellow. |
| 39 | —CH=N⁺(5-Cl-indoline) | Cl⁻ | Do. |

TABLE C

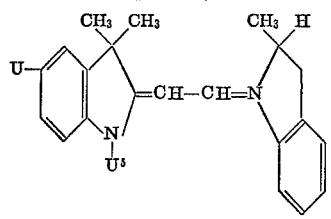

| Number | U | U⁵ | Shade on PAN |
|---|---|---|---|
| 40 | (tetrahydronaphth-oxazole) | CH₃ | Greenish yellow. |
| 41 | (cyclopenta-fused benzoxazole) | C₂H₅ | Do. |
| 42 | (naphth-oxazole) | CH₃ | Do. |

TABLE C—Continued
| Number | U | U⁵ | Shade on PAN |
|---|---|---|---|
| 43 | 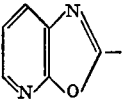 | $CH_3$ | Do. |
| 44 | 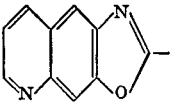 | $CH_3$ | Yellow. |
| 45 | 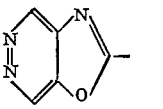 | [$CH_3$ | Greenish yellow. |
| 46 | 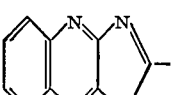 | $CH_3$ | Yellow. |
| 47 | 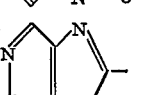 | $CH_3$ | Greenish yellow. |
| 48 | 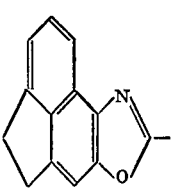 | $CH_3$ | Do. |
| 49 | 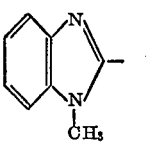 | $CH_3$ | Do. |
| 50 | 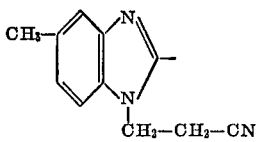 | $CH_3$ | Do. |
| 51 | 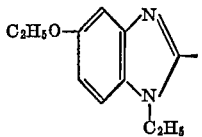 | $C_2H_5$ | Yellow. |
| 52 | 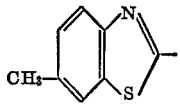 | $CH_3$ | Do. |
| 53 | 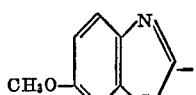 | $CH_3$ | Do. |
| 54 | 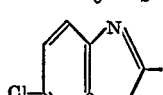 | $CH_3$ | Do. |
| 55 | 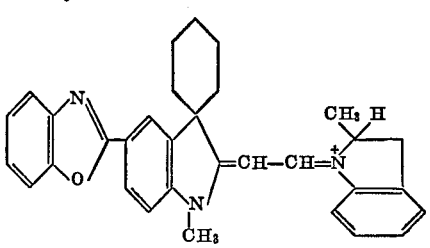 | $Cl^\ominus$ | Greenish yellow. |

EXAMPLE 2

Polyacrylonitrile fibres are introduced at 40° in a liquor ratio of 1:40 into an aqueous bath containing, per litre, 0.75 g. of 30% acetic acid, 0.38 g. sodium acetate and 0.1 g. of the dyestuff of the Formula 1. The dyebath is heated to boiling temperature within 30 minutes and kept at the same temperature for 45 minutes. After rinsing and drying, there is obtained a strongly greenish yellow dyeing which has a very clear shade and outstanding fastness properties.

Dyeings of a similarly high quality are obtained when the dyestuff of the Formula 1 is replaced with one of the dyestuffs mentioned in Tables A, B and C of Example 1.

EXAMPLE 3

A fabric of polyacrylonitrile is printed with a printing paste prepared in the following way:

330 parts of hot water are poured over 30 parts of the dyestuff of the Formula 2, 50 parts thiodiethylene glycol, 30 parts cyclohexanol and 30 parts of 30% acetic acid and the resultant solution is added to 500 parts of crystal gum (as thickening agent). Finally, 30 parts by weight of zinc nitrate solution are added.

The print obtained is dried, steamed for 30 minutes and subsequently rinsed. A greenish-yellow shade of outstanding fastness properties is obtained.

EXAMPLE 4

Acid-modified polyethylene terephthalate fibres are introduced at 20° in a liquor ratio of 1:40 into an aqueous bath which contains, per litre, 5 g. of sodium sulphate, 1 g. oleyl polyglycol ether (50 mol ethylene oxide), 5 g. dimethyl-benzyl-dodecyl-ammonium chloride and 0.1 g. of the dyestuff of the Formula 1 and which has been adjusted to a pH value of 4–5 with acetic acid. The dyebath is heated to boiling point within 30 minutes and kept at boiling temperature for 60 minutes. The fibres are subsequently rinsed and dried. A clear yellow dyeing of very good fastness properties is obtained.

EXAMPLE 5

Acid-modified synthetic polyamide fibres are introduced at 40° in a liquor ratio of 1:40 into an aqueous bath which contains, per litre, 10 g. sodium acetate, 1 to 5 g. oleyl polyglycol ether (50 mol ethylene oxide) and 0.15 g. of the dyestuff of the Formula 34 (Example 1, Table B) and which has been adjusted to pH 4–5 with acetic acid. The dyebath is heated to boiling point within 30 minutes and kept at boiling temperature for 60 minutes. The fibres are subsequently rinsed and dried. A greenish-yellow dyeing of good fastness properties is obtained.

EXAMPLE 6

Polyacrylonitrile fibres are introduced in a liquor ratio of 1:10 into a perchloroethylene bath containing, per litre, 1 g. oleic acid ethanolamide, 1 g. of the reaction product of 1 mol oleyl alcohol with 20 mol ethylene oxide, 8 g. of water, 1 g. of glacial acetic acid, and 1 g. of the dyestuff of the Formula 10 (Example 1, Table A). The dyebath is heated in a closed dyeing apparatus at 100° for 60 minutes, while the liquor is vividly agitated. The fibres are subsequently rinsed in perchloroethylene and dried in an air current. A very clear greenish yellow dyeing of very good fastness properties is obtained.

EXAMPLE 7

A stock solution is prepared from 15 parts by weight of the dyestuff of Formula 1, 15 parts by weight polyacrylonitrile and 70 parts by weight dimethyl formamide, and this is added to a conventional spinning solution of polyacrylonitrile which is spun in the usual way. A very clear, greenish yellow dyeing of good fastness properties is obtained.

What is claimed is:

1. Azoloindoline dyestuff of the formula

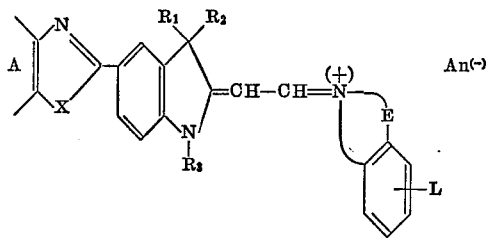

wherein $R_1$ and $R_2$ are alkyl of 1–5 carbon atoms or, when joined together, tetramethylene or pentamethylene;

$R_3$ is allyl, benzyl, chlorobenzyl, phenylethyl, alkyl of 1–5 carbon atoms or substituted alkyl of 1–5 carbon atoms where the substituent is halogen, cyano, alkoxycarbonyl of 2–6 carbon atoms, or dialkylaminocarbonyl of 1–5 carbon atoms in each alkyl portion;

X is oxygen, sulfur, or $>NR_4$;

$R_4$ is alkyl of 1–5 carbon atoms, unsubstituted or substituted by cyano;

A is a residue of an aromatic ring selected from the group consisting of benzene, naphthalene, Tetralin, indane, acenaphthene, pyridine, quinoline, quinoxaline, pyrimidine, indazole, and any of said residues substituted by halogen, cyclohexyl, benzyl, phenylethyl, phenyl, alkyl of 1–8 carbon atoms, haloalkyl of 1–5 carbon atoms, hydroxyalkyl of 1–5 carbon atoms, alkoxyalkyl of 1–5 carbon atoms in each of the alkoxy and alkyl portions, alkoxy of 1–5 carbon atoms, alkylsulphonyl of 1–5 carbon atoms, benzylsulphonyl, dialkylaminosulphonyl of 1–5 carbon atoms in each alkyl portion, dialkylaminocarbonyl of 1–5 carbon atoms in each alkyl portion, alkoxycarbonyl of 2–6 carbon atoms, acetylamino, propionylamino, or methylsulphonylamino;

E is the residual member which forms, with nitrogen and the adjacent benzene ring, indoline; 2-alkyl indoline of 1–5 carbon atoms in the alkyl portion; 1,2,3,4′-tetrahydroquinoline; 2,2,4 - trialkyl-1,2,3,4-tetrahydroquinoline of 1–5 carbon atoms in each alkyl; 1,2,3,4 - tetrahydroquinoxaline; 1,2,3,4,4a,9a-hexahydrocarbazole; or 2,3-dihydro-4H-benzoxazine-(1,4);

L is hydrogen, halogen, alkyl of 1–4 carbon atoms, or alkoxy of 1–4 carbon atoms; and $An^{(-)}$ is an anion.

2. An azoloindoline dyestuff of the formula

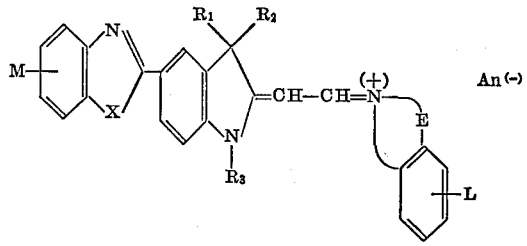

M=hydrogen or one or two members of the group consisting of alkyl of 1–8 carbon atoms, haloalkyl of 1–8 carbon atoms, cyclohexyl, phenyl, benzyl, phenylethyl, alkoxy of 1–5 carbon atoms, halogen, alkylsulphonyl of 1–5 carbon atoms, dialkylaminocarbonyl of 1–5 carbon atoms in each alkyl portion, alkylcarbonylamino of 2–6 carbon atoms; dialkylaminocarbonyl of 1–5 carbon atoms in each alkyl portion, alkoxycarbonyl of 2–6 carbon atoms, methoxyalkoxycarbonyl of 3–7 carbon atoms; and X, $R_1$, $R_2$, $R_3$ E, L, and $An^{(-)}$ have the same meanings as in claim 1.

3. An azoloindoline dyestuff of the formula
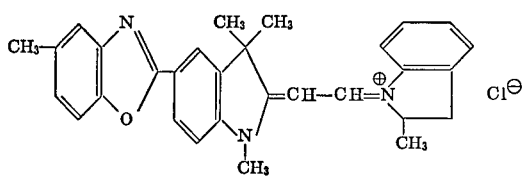
4. An azoloindoline dyestuff of the formula
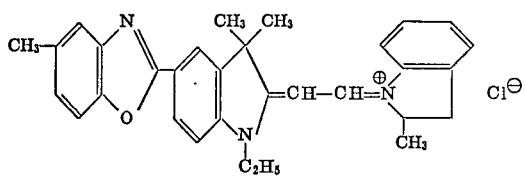
5. An azoloindoline dyestuff of the formula
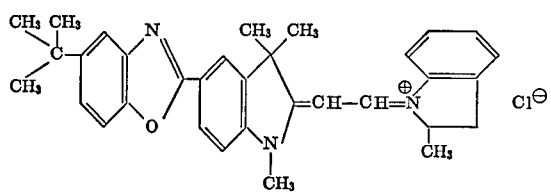
6. An azoloindoline dyestuff of the formula
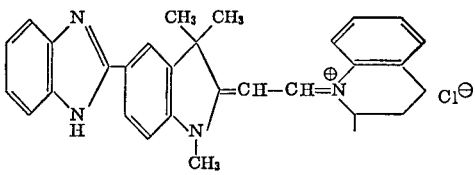
7. An azoloindoline dyestuff of the formula
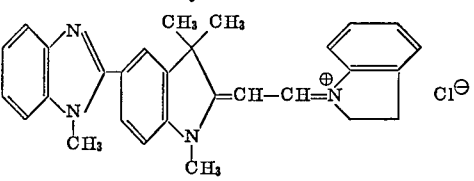
References Cited
UNITED STATES PATENTS
2,906,588  9/1959  Brunkhorst et al. _ 260—240.8 X
3,597,424  8/1971  Hunter _____ 260—240.8
JOHN D. RANDOLPH, Primary Examiner
U.S. Cl. X.R.
8—162 R, 177 R, 178 R; 162—134; 260—240.8, 250 A, 256.4 F, 304, 307 D, 309.2

UNITED STATES PATENT OFFICE
CERTIFICATE OF CORRECTION

Patent No. 3,775,407          Dated November 27, 1973

Inventor(s) Horst Harnisch

It is certified that error appears in the above-identified patent and that said Letters Patent are hereby corrected as shown below:

Column 2, lines 67 in the formula " 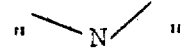 "

should read --- 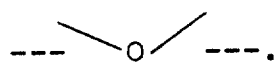 ---.

Column 3, line 49, "cetonitrile" should read ---acetonitrile---.

Column 6, line 43, "aliphtic" should read ---aliphatic---.

Column 8, Table A under Column "Shade on PAN" "greensih yellow" should read ---greenish yellow---.

Column 16, Claim 6, in the formula " 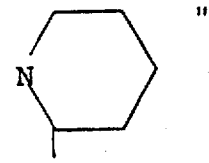 "

should read ---  ---

Column 16, Claim 7, in the formula " 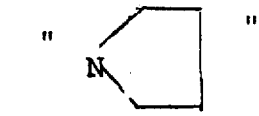 "

should read --- 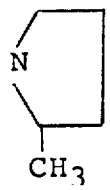 ---

Signed and sealed this 11th day of February 1975.

(SEAL)
Attest:

RUTH C. MASON
Attesting Officer

C. MARSHALL DANN
Commissioner of Patents
and Trademarks